United States Patent [19]

Mori et al.

[11] Patent Number: 4,930,910
[45] Date of Patent: Jun. 5, 1990

[54] BEARING ARRANGEMENT

[75] Inventors: Sanae Mori; Masaaki Sakamoto, both of Nagoya; Takuo Wada, Inuyama; Yoshikazu Mizuno, Nagoya; Masakazu Sato, Utsunomiya, all of Japan

[73] Assignee: Honda Giken Kogyo Kabushiki Kaisha

[21] Appl. No.: 289,299

[22] Filed: Dec. 23, 1988

[30] Foreign Application Priority Data

Dec. 26, 1987 [JP] Japan ................. 62-330897
Jan. 23, 1988 [JP] Japan ................. 63-6665[U]

[51] Int. Cl.$^5$ .............................................. F16C 9/04
[52] U.S. Cl. ..................................... 384/276; 384/288
[58] Field of Search ............. 384/276, 288, 294, 429, 384/625

[56] References Cited

U.S. PATENT DOCUMENTS

| | | | |
|---|---|---|---|
| 2,850,334 | 9/1958 | Hurley | 384/294 |
| 2,914,367 | 11/1959 | Underwood | 384/288 |
| 3,249,391 | 5/1966 | DeHart et al. | 384/294 |
| 4,658,500 | 4/1987 | Eagel et al. | 384/625 X |
| 4,668,107 | 5/1987 | Showalter | 384/288 X |

FOREIGN PATENT DOCUMENTS 56-4021  1/1981  Japan .
56-13407 2/1981  Japan .

*Primary Examiner*—Thomas R. Hannon

[57] ABSTRACT

A bearing arrangement including a plain bearing consisting of a laminated body of a bearing layer and a backing metal supporting the bearing layer. The backing metal is made of a material whose modulus of elasticity is lowered by cold working (austenitic stainless steel), and the bearing layer and the backing metal are joined to each other by cold rolling. Since a working proportion of the backing metal upon the above-mentioned cold rolling is small in the inside portion held in contact with the bearing layer but is large in the outside portion, the modulus of elasticity of the backing metal is different between the inside portion and the outside portion thereof, and the modulus of elasticity in the outside portion is smaller than the modulus of elasticity in the inside portion. Also, the hardness of the outside portion is higher than the hardness of the inside portion. The above-mentioned plain bearing is of half-split type or wrapped bush type, and it is interposed between a bearing housing of the type that two halves are coupled together by means of bolts and a rotary shaft to be supported with a predetermined interference.

7 Claims, 9 Drawing Sheets

BEARING ARRANGEMENT

BACKGROUND OF THE INVENTION

The present invention relates to a bearing arrangement including a plain bearing consisting of a laminated body of a bearing layer and a backing metal supporting the bearing layer, and more particularly to a bearing arrangement composed of a bearing housing of the type that two halves are coupled together by means of bolts, and a half-split type or wrapped bush type of plain bearing interpored between a rotary shaft to be supported and the bearing housing with a predetermined interference and consisting of a laminated body of a bearing layer and a backing metal supporting the bearing layer.

In an internal combustion engine, the opposite end portions (smaller end portion and larger end portion) of a connecting rod connecting a piston with a crank shaft form bearing housings of bearing arrangements respectively supporting a piston pin and the crank shaft (crank pin). The smaller end portion forms an integral type of bearing housing having a through-hole, and a plain bearing for supporting the piston pin is press-fitted into the through-hole. The larger end portion forms a bearing housing of the type of coupling two halves together by means of bolts, and within this bearing housing is fitted a half-split type plain bearing with a predetermined interference (crush height amount).

Now, in order to contemplate to realize a high output power, a high speed and a light weight of an engine, examples of making a connecting rod of aluminum alloy are being increased. However, in the case of the bearing housing made of aluminum alloy (the smaller end portion and the larger end portion of the connecting rod made of aluminum alloy), since a coefficient of thermal expansion (about $23 \times 10^{-6}$) of the connecting rod is nearly twice as large as a coefficient of thermal expansion (about $12 \times 10^{-6}$) of a bearing made of ordinary steel, it is necessary to compensate for the difference of thermal expansion between the bearing housing and the bearing resulted from temperature rise, and so, various countermeasures have been taken.

The countermeasure disclosed in Laid-Open Japanese Utility Model Specification No. 56-4021 (1981) is one example, in which a bush made of ferrous metal (for instance, a bush made of austenitic stainless steel) having a coefficient of thermal expansion equal or close to that of the aluminum alloy is press-fitted into the smaller end portion of the connecting rod made of aluminum alloy. In this example, since the coefficient of thermal expansion (about $18 \times 10^{-6}$) of the bush made of austenitic stainless steel is considerably large as compared to that of ordinary steel and has a value close to the coefficient of thermal expansion of aluminum alloy, even if the interference of the bush caused by the smaller end portion forming a bearing housing is chosen smaller than the interference for the bush made of ordinary steel (that is, even if the fastening stress of the bearing housing is made small), a following property of the bush to the thermal expansion deformation of the smaller end portion can be insured. However, when the smaller end portion made of aluminum alloy and the bush made of austenitic stainless steel has expanded and deformed, there is a possibility that the clearance between the bush and the shaft made of ordinary steel may increase, and also, there is a shortcoming that as the austenitic stainless steel is poor in thermal conductivity as compared to ordinary steel, heat transmission between the shaft and the smaller end portion cannot be achieved smoothly.

Now let us imagine the case where the inventive concept disclosed in the above-referred Laid-Open Japanese Utility Model Specification No. 56-4021(1981) is applied to a bearing housing formed by coupling together two halves made of aluminum alloy by means of bolts made of ordinary steel as is the case with the larger end portion of the connecting rod, and a cylindrical bush made of austenitic stainless steel has been interposed between the shaft made of ordinary steel and the bearing housing. When a temperature has risen, thermal expansion of the respective halves of the bearing housing is supressed by the bolts in the axial direction of the bolts, but is allowed in the direction perpendicular the axes of the bolts, and so, as a result the bearing housing is deformed into a laterally elongated shape. At this moment, since the bush has a cylindrical shape, a following property thereof to the bearing housing which deforms into a laterally elongated shape, is poor, and so, there is a possibility that an increased clearance may arise between the bearing housing and the bush at the positions close to the bolts.

In the case of such a bearing housing formed by coupling together two halves by means of bolts in the above-described manner, if a half-split type plain bearing is fitted into the bearing housing with a predetermined interference as described above, then this plain bearing can deform well following to the laterally elongated deformation of the bearing housing. However, since the plain bearing would repeat deformation between a truly circular shape and a laterally elongated shape according to temperatures variations, this plain bearing is required to have a good fatigue characteristic.

While a plain bearing made of a laminated metal strip formed by providing a bearing alloy layer made of white metal, Kelmet metal, aluminum alloy, etc. on a backing metal made of steel has been known as disclosed in, for example, Laid-Open Japanese Utility Model Specification No. 56-13407 (1981), even with such plain bearing the above-described various problems would still remain with respect to the backing metal made of steel.

SUMMARY OF THE INVENTION

Accordingly, the present invention has it as an object to improve a following property of a plain bearing to deformation by thermal expansion of a bearing housing and to improve a fatigue characteristic in a bearing arrangement including a plain bearing consisting of a laminated body of a bearing layer and a backing metal supporting the layer.

In addition, the present invention has it as an object to prevent increase of a clearance between a rotary shaft and a plain bearing upon deformation by thermal expansion in the above-described bearing arrangement.

Furthermore, the present invention has it as an object to improve a heat transmission property between a rotary shaft and a bearing in the aforementioned bearing arrangement.

In order to achieve the aforementioned objects, in the bearing arrangement according to the present invention, the backing metal of the plain bearing is made of a material whose modulus of elasticity is lowered by cold working and it is joined to the bearing layer by cold rolling.

Since a working proportion of the backing metal when the backing metal and the bearing layer are superposed and subjected to cold rolling is small at the inside portion held in contact with the bearing layer, but large at the outside portion, moduli of elasticity of the backing metal made of the aforementioned material differ from the inside portion to the outside portion, and the modulus of elasticity at the outside portion is smaller than that at the inside portion. Accordingly, the plain bearing according to the present invention would deform well following the deformation by thermal expansion of the bearing housing having a large coefficient of thermal expansion, and moreover, since the magnitude of variation and the absolute value of the stress produced in the outside layer of the backing metal due to deformation by thermal expansion are small as compared to those in the prior art, an improvement in a fatigue characteristic can be contemplated.

In order to obtain the plain bearing according to the present invention having the aforementioned characteristics, it is most suitable to employ austenitic stainless steel as a backing metal. While both a hardness and a modulus of elasticity would increase if a proportion of cold working becomes large in the case of steal varieties other than austenitic stainless steel, in the case of austenitic stainless steel there is a tendency that if a proportion of cold working becomes large, though a hardness would increase in correspondence to the proportion of working, a modulus of elasticity would be lowered. Accordingly, in a backing metal made of austenitic stainless steel, a hardness of the outside layer would become large, and an anti-fretting property between the backing metal and the bearing housing would be also improved.

In a plain bearing employing austenitic stainless steel as a backing metal, it is preferable to form a bearing layer of alloy material having a large coefficient of thermal expansion as compared to austenitic stainless steel. With such plain bearing, increase of a clearance between a rotary shaft and the plain bearing upon deformation by thermal expansion can be prevented.

In addition, by substantially thinning a backing metal through cold rolling, a heat transmission property between a rotary shaft and a bearing housing can be improved. Here it is to be noted that the expression of "substantially thinning" a backing metal implies that the backing metal is thinned by 30–50% as compared to the conventional backing metal, and in contrast to the fact that a thickness of a backing metal made of ordinary steel to be used for a crank main journal in a passenger car engine of the class of displacement of 2000 cc is about 1.6 mm, the thickness of the backing metal is reduced to, for instance, 1.1–1.2 mm.

DETAILED DESCRIPTION OF THE PREFERRED EMBODIMENTS

Figure 1:
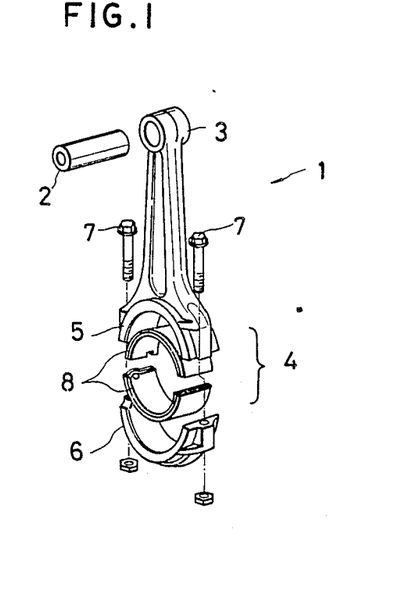
FIG. 1 is a disintegrated perspective view of a connecting rod for an internal combustion engine embodying the present invention.

FIG. 1 shows a connecting rod used in an internal combustion engine as a disintegrated perspective view. A connecting rod 1 is a member for connecting a piston with a crank shaft, a portion of the connecting rod 1 into which a piston pin 2 is to be fitted is called a smaller end portion 3, and a portion thereof to be coupled to a crank shaft (crank pin) is called a larger end portion 4. This larger end portion 4 is a bearing housing severed into two, upper and lower halves along a plain containing a center axis of a crank pin, and the bearing housing is formed by coupling a larger end half portion 5 and a bearing cap 6 together by means of steel bolts 7, 7. Within the bearing housing is fitted a half-type of plain bearing 8 with a predetermined interference (crush height amount).

Figure 2:
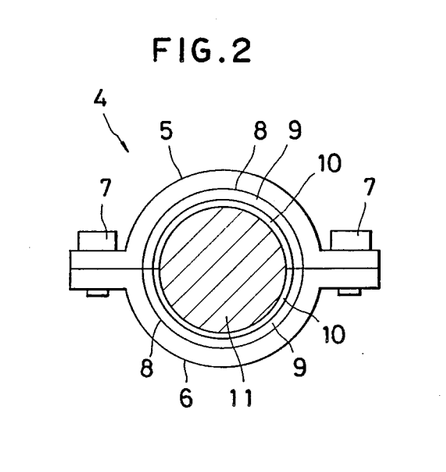
FIG. 2 is a schematic view showing a larger end portion (bearing arrangement) of the same connecting rod.
Figure 3:
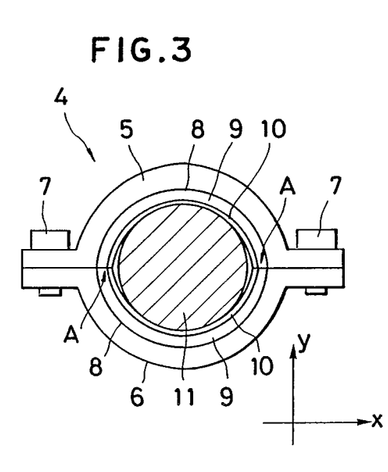
FIG. 3 is a similar schematic view showing a deformed state of the same larger end portion caused by temperature rise.

In order to realize a high output power, a high speed and a light weight of an engine, the above-described connecting rod 1 is made of aluminum alloy. The plain bearing 8 is formed of a laminated body of a backing metal 9 made of austenitic stainless steal and a bearing alloy layer 10 made of aluminum alloy or the like, as shown in FIG. 2. If a temperature rises, the larger end portion 4 would deform into a laterally elongated shape as shown in FIG. 3 (In this figure, the deformation is depicted in an exaggerated manner.). The reason why it deforms in such manner is because thermal expansion of the larger end portion 4 made of aluminum alloy having a large coefficient of thermal expansion is suppressed in the y-direction by the steel bolts 7, 7 having a small coefficient of thermal expansion and the thermal expansion occurs mainly in the x-direction. When the larger end portion 4 deforms as shown in FIG. 3, the plain bearing 8 interposed between a crank shaft 11 made of steel and the larger diameter portion with a predetermined interference would also deform following the larger end portion 4, and at that moment a good following property in deformation is required for the plain bearing 8.

When the plain bearing 8 has been assembled in the bearing housing 4 with an appropriate interference, compression stress in the circumferential direction will arise in the backing metal 9. The compression stress is large on the side of the inner circumference as compared to that on the side of the outer circumference, and the maximum stress $\sigma_{max}$ on the inner circumference is represented by the following formula:

$$\sigma_{max} = -\delta \cdot K(1/E + k) \quad (1)$$

Where k is a coefficient determined depending upon the bearing housing, K is a constant, E is a modulus of elasticity of the backing metal, and $\delta$ is the interference.

Figure 6:
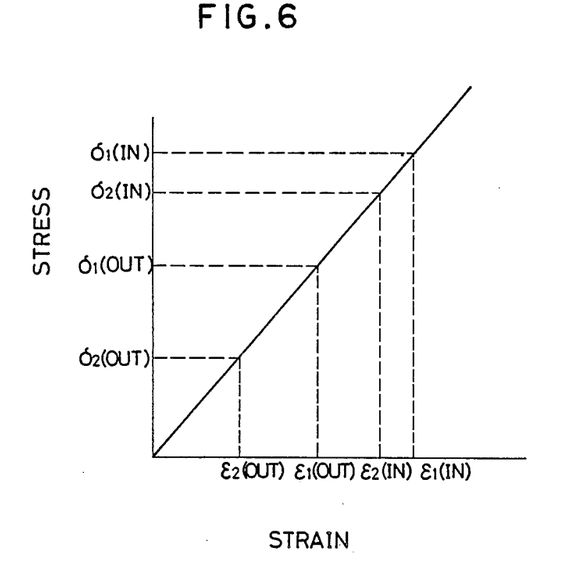
FIG. 6 is a diagram showing a deformation characteristic of a plain bearing made of ordinary steel for the purpose of comparing with a deformation characteristic of a plain bearing according to the present invention.

Assuming now that the backing metal of the plain bearing is made of ordinary steel, initial stresses ($\sigma$) and strains ($\epsilon$) at the inner circumferential portion and the outer circumferential portion of the backing metal when this plain bearing has been assembled in the bearing housing made of aluminum alloy with a predetermined interference are represented respectively by $\sigma_1(in)$, $\epsilon_1(in)$ and $\sigma_1(out)$, $\epsilon_1(out)$; and stresses and strains at the inner circumferential portion and the outer circumferential portion when a temperature has risen and the bearing housing as well as the plain bearing have been deformed by thermal expansion as shown in FIG. 3, are represented respectively by $\sigma_2(in)$, $\epsilon_2(in)$ and $\sigma_2(out)$, $\epsilon_2(out)$. If these stresses and strains are plotted in a stress-strain diagram (elastic region) of the backing metal forming material (ordinary steel), they are represented as shown in FIG. 6 (In this figure, the differences in a stress and a strain between the inner and outer circumferences are shown in an enlarged scale as exaggerated.). Although the stresses $\sigma_1(in)$ and $\sigma_1(out)$ and the strains $\epsilon_1(in)$ and $\epsilon_1(out)$ under the initial condition are large, when the temperature rises and the bearing housing made of aluminum alloy is deformed by thermal expansion, the clamping force for the packing metal is lowered, hence partial release of the strain is effected, and so, the stresses and strains would become smaller than those under the initial condition and become $\sigma_2(in)$, $\sigma_2(out)$ and $\epsilon_2(in)$ and $\epsilon_2(out)$, respectively. At this moment, the amount of variation of the strains at the inner and outer circumferences would fulfil the following relation:

$$\epsilon_1(in) - \epsilon_2(in) < \epsilon_1(out) - \epsilon_2(out) \quad (2)$$

Figure 4:
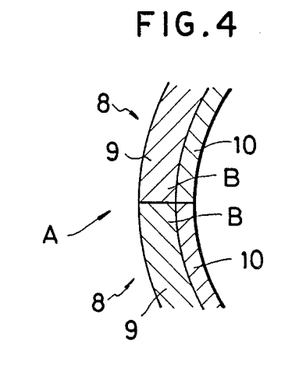
FIG. 4 is a partial enlarged view showing a part of FIG. 2.
Figure 5:
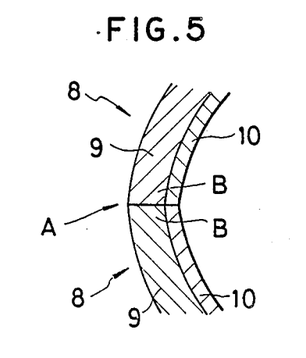
FIG. 5 is a partial enlarged view showing a part of FIG. 3.

In other words, the amount of release of the strain at the outer circumference is large as compared to that at the inner circumference. This is due to the following reasons. FIG. 4 shows a butt end portion A of a half-split type plain bearing 8 assembled in the housing made of aluminum alloy. If the bearing housing is deformed by thermal expansion into a laterally elongated shape as described above, then the plain bearing halves 8, 8 would deform following the deformation of the bearing housing. At this moment, in the butt end portion A, an inside layer B of a backing metal 9 deforms (elastic deformation) as if it were to be crushed, and the butt end portion A of the plain bearing 8, 8 takes the shape projecting outwards. Accordingly, as represented by Formula-(2) above, the released amount of strain in the outside layer of the backing metal 9 becomes larger than the released amount of strain in the inside layer. And the fact that the released amount of strain in the outside layer is large, means that a following property of the backing metal 9 to the bearing housing is excellent. Since a strain and a stress have a predetermined relationship, Formula-(2) above implies that the stress difference between the inside layer and the outside layer of the backing metal is enlarged by temperature rise as represented by the following Formla-(3), and in other words, the fact that the stress difference is enlarged within an elastic region implies that a following property of the backing metal 9 to the bearing housing is excellent:

$$\sigma_1(in) - \sigma_1(out) < \sigma_2(in) - \sigma_2(out) \quad (3)$$

Figure 7:
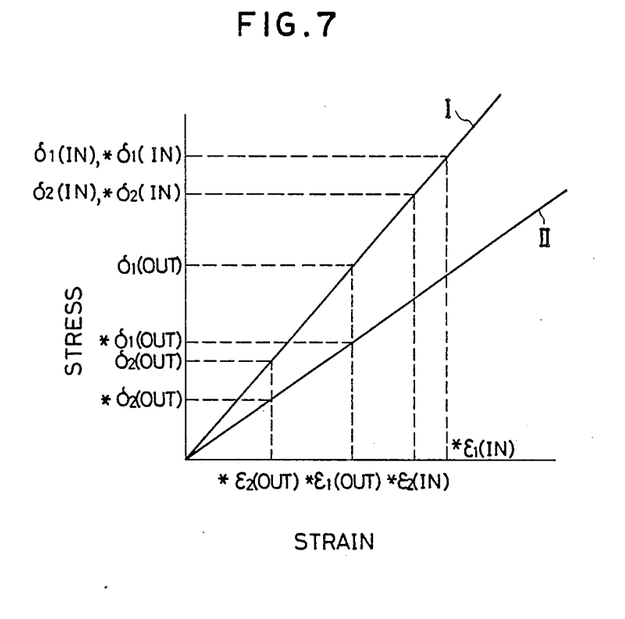
FIG. 7 is a diagram showing deformation characteristics of a plain bearing according to the present invention.

The above mentioned is a description with respect to a backing metal made of ordinary steel. However, in the plain bearing 8 according to the present invention, the backing metal 9 is made of austenitic stainless steel. As will be seen from FIG. 10, in the case of ordinary steel, if a proportion of cold working becomes large, both a hardness and a modulus of elasticity would increase, but in the case of austenitic stainless steel, if a proportion of cold working becomes large, while a hardness would increase in accordance with the working proportion, a modulus of elasticity tends to decrease. Accordingly, if an austenitic stainless steel sheet is superposed on a bearing alloy sheet having a small hardness as compared to that steel sheet and they are rolled, then due to the fact that a working proportion is small on the side of the joined surface of the austenitic stainless steel sheet and a working proportion becomes large on the side of the unjoined surface, on the side of the joined surface a modulus of elasticity becomes large and a hardness becomes small, but on the side of the unjoined surface a modulus of elasticity becomes small and a hardness becomes large (the measure of large or small being relative). FIG. 7 shows stress-strain characteristics (in an elastic region) of such backing metal. Straight line I indicates the characteristic of the inside layer of the backing metal, while straight line II indicates the characteristic of the outside layer of the backing metal. In this case, if the stresses and strains in the inner circumferential portion and the outer circumferential portion, respectively, of the particular backing metal are represented by the aforementioned reference characters $\sigma$ and $\epsilon$ but added with a symbol * (asterisk), that is, by *$\sigma_1(in)$, *$\epsilon_1(in)$, *$\sigma_1(out)$, *$\epsilon_1(out)$, *$\sigma_2(in)$, *$\epsilon_2(in)$, *$\sigma_2(out)$ and *$\epsilon_2(out)$, then under the initial condition (suffix 1) and upon temperature rise (suffix 2), the respective values of the stresses $\sigma$ and the strains $\epsilon$ are plotted in FIG. 7.

Assuming now that the modulus of elasticity of the inner circumferential portion of this backing metal made of austenitic stainless steel is equal to the modulus of elasticity of the backing metal made of ordinary steel shown in FIG. 6, and that the dimensions of the bearing housing made of aluminum alloy and the plain bearing and the temperature of the initial condition as well as the temperature after the temperature rise are identical to those in the case of the backing metal made of ordinary steel explained previously with reference to FIG. 4, then the following equations are fulfilled:

$$*\epsilon_1(in) = \epsilon_1(in)$$

$$*\epsilon_2(in) = \epsilon_2(in)$$

$$*\epsilon_1(out) = \epsilon_1(out)$$

$$*\epsilon_2(out) = \epsilon_2(out)$$

$$*\sigma_1(in) = \sigma_1(in)$$

$$*\sigma_2(in) = \sigma_2(in)$$

Accordingly, a formula similar to Formula-(2) above can be fulfilled, and hence an excellent following property can be obtained.

On the other hand, with regard to the stresses in the outside layer, the following relations are fulfilled:

$$^*\sigma 1(out) < \sigma 1(out)$$

$$^*\sigma 2(out) < \sigma 2(out)$$

$$^*\sigma 1(out) - {}^*\sigma 2(out) < \sigma 1(out) - \sigma 2(out)$$

and so, it can be understood that in the backing metal made of austenitic stainless steel, absolute stress values and an amount of variation of a stress in the outside layer are small as compared to the case of the backing metal made of ordinary steel, and hence improvements in a characteristic for opposing fatigue caused by temperature variation can be contemplated.

In order to obtain a plain bearing having different moduli between the inside layer and the outside layer as described above, it is adequate to employ the following process for manufacture.

Figure 8:
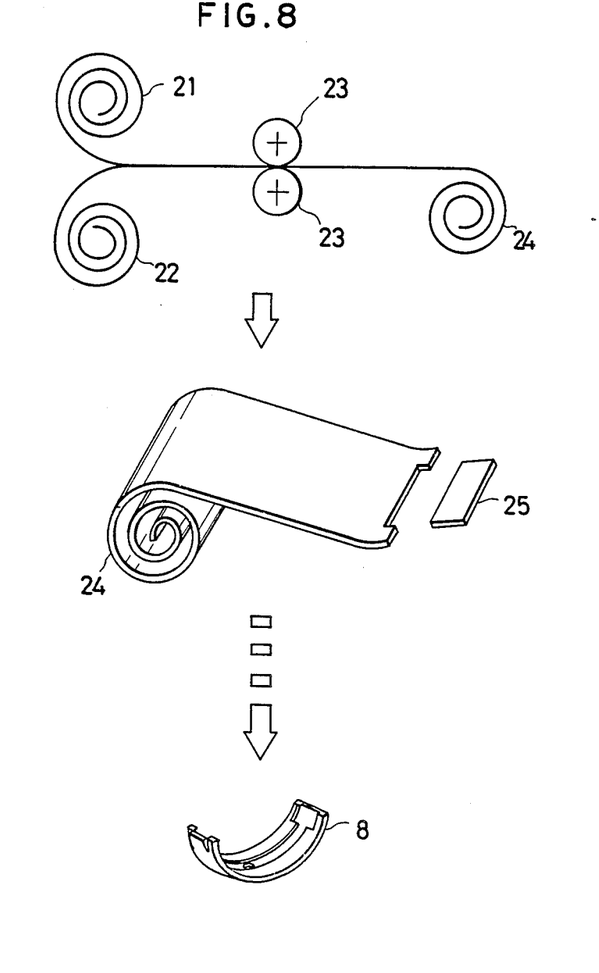
FIG. 8 is a schematic view showing a manufacturing process of a half-split type of plain bearing according to the present invention.

The process for manufacture is shown in FIG. 8. Two kinds of rolled raw material strips, that is, a strip 21 made of bearing alloy (for instance, aluminum alloy) and a strip 22 of austenitic stainless steel are subjected to a cleaning treatment and a surface roughening treatment (for roughening the surface of the strip 22), and under a mutually superposed condition the both strips are subjected to cold rolling by means of rolls 23 to integrally join the strip 21 onto the surface of the strip 22 under pressure. While the strip 22 is subjected to work hardening during this cold rolling work, on the side of coming into contact with the strip 21 made of bearing alloy which is soft as compared to steel, an extent of working is low as compared to the on the side of coming into direct contact with the roll 23, and so, a desired hardness difference and a desired difference in the modulus of elasticity can be obtained.

A laminated strip 24 obtained by press-joining the both strips 21 and 22 is cut into a small piece 25, and thereafter it is worked into a half-split type of plain bearing 8 through the working steps such as bend working, width finish and chamfer working, oil hole working, clawing oil groove working, oil reservoir working, height finish working, wall thickness finish working, plating treatment, etc.

Figure 9:
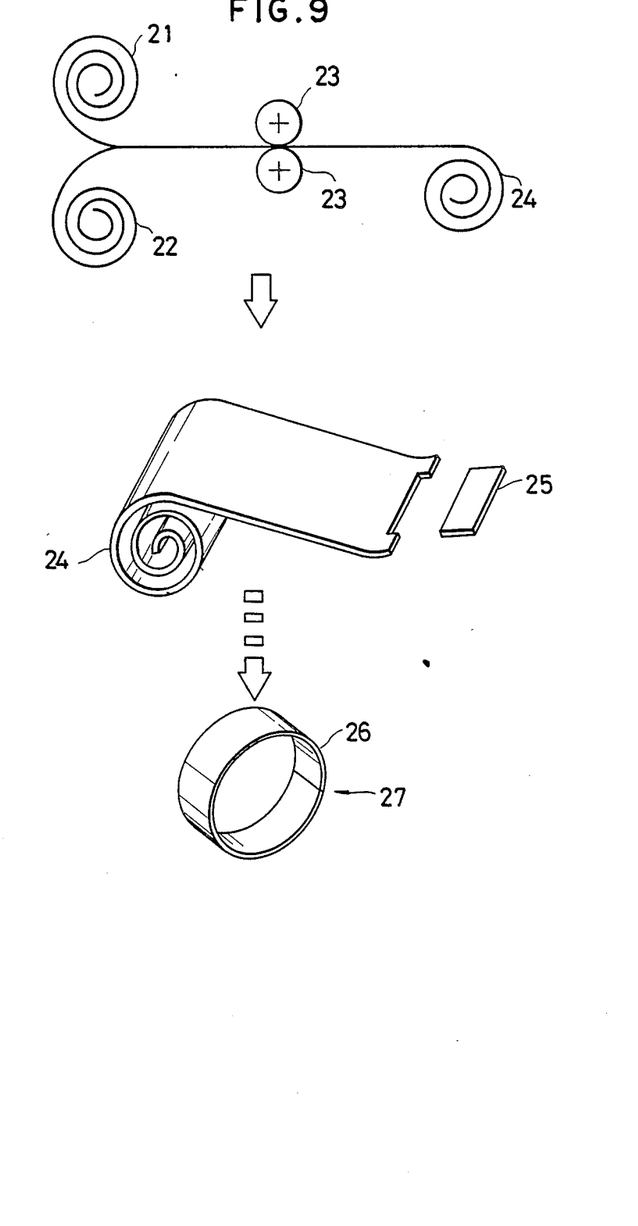
FIG. 9 is a schematic view showing a manufacturing process of a wrapped bush type of plain bearing according to the present invention.
Figure 10:
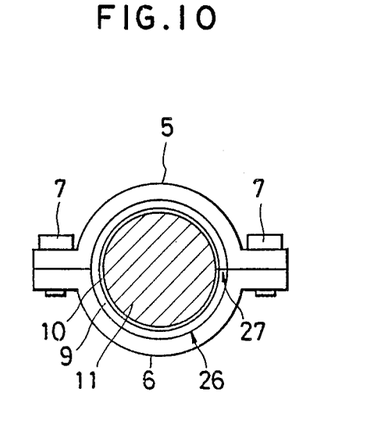
FIG. 10 is a schematic view similar to FIG. 2 showing a larger end portion of a connecting rod having a wrapped bush type of plain bearing.

Alternatively, as shown in FIG. 9, a wrapped bush type of plain bearing 26 can be obtained by bending the small piece 25 after cutting into a cylindrical shape, and subjecting it to successive working steps such as width finish and chamfer working, shaping, plating treatment, wall thickness finish working, etc. Reference numeral 27 designates a butting position in this wrapped bush type of plain bearing 26. FIG. 10 is a schematic view similar to FIG. 2, which shows a larger end portion of a connecting rod having the above-mentioned wrapped bush type of plain bearing, and in this figure component parts equivalent to those shown in FIG. 2 are given like reference numerals.

Figure 11:
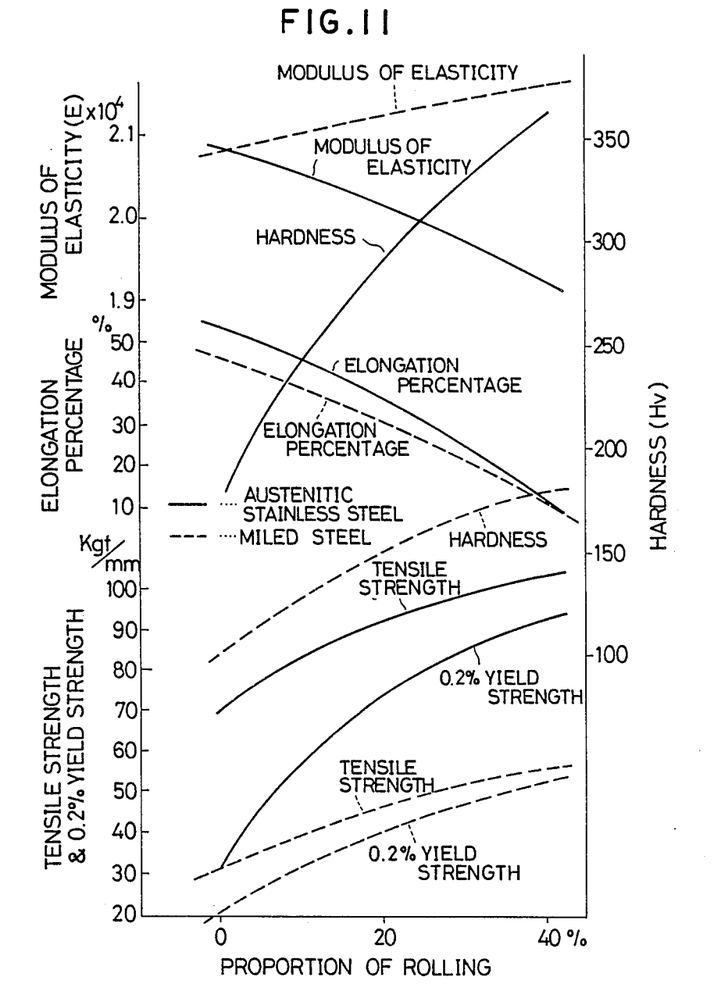
FIG. 11 is a diagram showing relations between a proportion of rolling work and properties of ordinary steel and austenitic stainless steel.

The outside layer of the backing metal made of austeninc stainless steel in the obtained plain bearings 8 and 26 has a large hardness and a small modulus of elasticity, whereas the inside layer thereof (on the side of being held in contact with the bearing alloy layer) has a small hardness and a large modulus of elasticity. The reason is because in contrast to the fact that a modulus of elasticity (E) of ordinary steel would increase as a proportion of rolling is increased, that of austeritic stainless steel would decrease as a proportion of rolling is increased (See FIG. 11: a hardness and a tensile strength would be increased as a proportion of rolling is increased in the both cases of ordinary steel and stainless steel).

Therefore, if the plain bearing 8 or the plain bearing 26 is assembled with a predetermined interference in the bearing housing made of aluminum alloy to be built by means of steal bolts, and if the bearing housing is deformed by thermal expansion due to temperature rise under the condition of supporting a shaft made of steel, then the plain bearing 8 or 26 would deform easily following the deformation of the bearing housing as described above, and in addition, since the amount of varation of the stress and the absolute value of the stress generated in the outside lager of the backing metal due to deformation by thermal expansion are small as compared to those in the prior art, improvements in fatigue characteristics can be contemplated.

Another advantage resulted from the use of austenitic stainless steel as a material of the backing metal in the plain bearing 8 or 26, is that a coefficient of thermal expansion (about $18 \times 10^{-6}$) of austenitic stainless steel is considerably large as compared to a coefficient of thermal expansion (about $12 \times 10^{-6}$) of ordinary steel, and hence upon assembling the plain bearing 8 or 26 in a bearing housing made of a material having a large coefficient of thermal expansion such as aluminum alloy, an interference of the plain bearing 8 or 26 need not be chosen so large, taking into account the large coefficient of thermal expansion of the bearing housing (in the case of a plain bearing made of plain steel, an interference must be chosen large.). In order to enlarge the interference, a rigidity of the bearing housing must be enlarged by increasing a wall thickness of the bearing housing in accordance therewith, and hence, by employing austenitic stainless steel as described above, realization of a light weight of the bearing housing and saving of materials can be contemplated.

Moreover, owing to the fact that the coefficient of thermal expansion of the backing metal made of austenitic stainless steel is close to the coefficient of thermal expansion (about $23 \times 10^{-6}$) of the bearing housing made of aluminum alloy, the difference in thermal expansion between the bearing housing and the plain bearing is reduced, and accordingly, a following property of the plain bearing to the thermal expansion of the bearing housing upon temperature rise, is excellent.

The plain bearing 8 or 26 having its backing metal 9 formed of austenitic stainless steel having a large coefficient of thermal expansion, would deform well following the deformation by thermal expansion of the bearing housing made of aluminum alloy in accordance with temperature rise, and although normally there is a tendency that the clearance between the rotary shaft 11 made of ordinary steel having a small coefficient of thermal expansion and the plain bearing 8 or 26 would increase, as the bearing alloy layer 10 is formed of a material (aluminum alloy) having a further larger coefficient of thermal expansion than austenitic stainless steel, increase of the clearance can be suppressed, and so, generation of knocking sound accompanying rotation of the rotary shaft 11 can be prevented.

Since the backing metal 9 made of austenitic stainless steel is sufficiently thinned by cold rolling, the shortcoming of austenitic stainless steel having a poor thermal conductivity can be compensated for, and heat transmission between the rotary shaft 11 and the bearing housing 5, 6 is not deteriorated.

As the backing metal 9 made of austenitic stainless steel has the hardness of the outside layer thereof increased by cold rolling (See FIG. 11), an anti-fretting property in relation to slide contact with the bearing housing is excellent. Degradation of a toughness caused by increase of a hardness in the outside layer can be compensated by the inside layer having a relatively low hardness.

What is claimed is:

1. A bearing arrangement including a plain bearing consisting of a laminated body of a bearing layer and a backing metal supporting the bearing layer, characterized in that said backing metal is made of a material whose modulus of elasticity is lowered by cold working, and said bearing layer and said backing metal are joined to each other by cold working.

2. A bearing arrangement as claimed in claim 1, wherein a modulus of elasticity of the inside portion of said backing metal held in contact with said bearing layer is higher than a modulus of elasticity of the outside portion thereof.

3. A bearing arrangement as claimed in claim 2, wherein a hardness of said outside portion of said baking metal is higher than a hardness of said inside portion thereof.

4. A bearing arrangement as claimed in claim 3, which is composed of a bearing housing of the type that two halves are joined together by means of bolts, and a half-split type or wrapped bush type of plain bearing to be inserted between a rotary shaft to be supported and said bearing housing with a predetermined interference, said plain bearing consisting of a laminated body of a bearing layer and a backing metal supporting the bearing layer, and a coefficient of thermal expansion of said bearing housing is larger than the coefficients of thermal expansion of said backing metal, bolts and rotary shaft.

5. A bearing arrangement as claimed in any one of claims 1 to 4, wherein said backing metal is made of austenitic stainless steel.

6. A bearing arrangement as claimed in claim 5, wherein said bearing layer is made of an alloy material having a large modulus of thermal expansion as compared to that of austenitic stainless steel.

7. A bearing arrangement as claimed in claim 5, wherein said backing metal is substantially thinned by cold rolling.

* * * * *

UNITED STATES PATENT AND TRADEMARK OFFICE
CERTIFICATE OF CORRECTION

PATENT NO. : 4,930,910
DATED : June 5, 1990
INVENTOR(S) : MORI et al

It is certified that error appears in the above-identified patent and that said Letters Patent is hereby corrected as shown below:

On the cover page, Item [73] should read:

--Assignees: Honda Giken Kogyo Kabushiki Kaisha, Tokyo; Daido Metal Kogyo Kabushiki Kaisha, Nagoya, both of Japan--.

Signed and Sealed this

Tenth Day of September, 1991

Attest:

HARRY F. MANBECK, JR.

Attesting Officer

Commissioner of Patents and Trademarks